UNITED STATES PATENT OFFICE.

WILLIAM W. JACQUES, OF NEWTON, ASSIGNOR TO THE AMERICAN BELL TELEPHONE COMPANY, OF BOSTON, MASSACHUSETTS.

GRANULATED MATERIAL FOR TRANSMITTING-TELEPHONES.

SPECIFICATION forming part of Letters Patent No. 495,090, dated April 11, 1893.

Application filed March 13, 1891. Serial No. 384,870. (No model.)

*To all whom it may concern:*

Be it known that I, WILLIAM W. JACQUES, of Newton, in the State of Massachusetts, have invented a new and useful Improvement in Granulated Material for Transmitting-Telephones, of which the following is a specification.

Different substances have widely different microphonic powers, and the efficiency of a telephone transmitter depends upon the microphonic power of its electrodes as well as upon the resistance between its electrodes. The greater the microphonic power and the lower the resistance the greater will be the efficiency of the transmitter. By microphonic power is meant the distance that the electrodes may move to and from each other without breaking contact.

The object of the invention is to produce granulated material of high microphonic power and low resistance and the invention consists in treating carbon with alumina as hereinafter set forth and in the resulting product.

I crush carbon to granules of one-twentieth to one twenty-fifth inch in diameter and wash them thoroughly by precipitation. These granules while moist I mix with alumina by rolling them in powdered alumina until they are coated with rather more than their original bulk. Next I pack the coated grains in a silica crucible (Hessian) and lute on cover leaving small holes at corners and then inclose the silica crucible in a larger crucible, pack the interstices with lamp black and lute on cover, again leaving small holes at corners. I then heat in large gas and blast furnace for thirty hours at 2,500° to 3,000° centigrade (dazzling white heat) taking care to raise the temperature slowly during the first three hours and to cool thoroughly before opening the crucibles. No air is allowed to come in contact with contents of the inner crucible until cool. The granules are then washed by precipitation and dried thoroughly.

The best carbon for the purpose of this invention is Pennsylvania anthracite showing by analysis carbon and a small percentage of alumina and silica and it may be added that the presence of silica with the carbon and alumina subjected to heat is regarded as beneficial to the resulting combination.

The granulated material thus produced when used in transmitting telephones of the Hunnings type as the variable resistance medium between the two electrodes is found to have higher microphonic power and lower resistance than grains of substantially pure carbon and other compounds of carbon ordinarily used for the same purpose.

I claim—

1. The herein described process of producing granulated material of high microphone power and low resistance, consisting in coating grains of carbon with powdered alumina and subjecting the coated grains to an intense white heat in an inert atmosphere substantially as described.

2. The herein described granulated material for transmitting telephones consisting of grains carbon treated with alumina substantially as described.

In testimony whereof I have signed my name to this specification, in the presence of two subscribing witnesses, this 4th day of March, 1891.

WILLIAM W. JACQUES.

Witnesses:
 GEO. WILLIS PIERCE,
 JOSEPH A. GATELY.